UNITED STATES PATENT OFFICE.

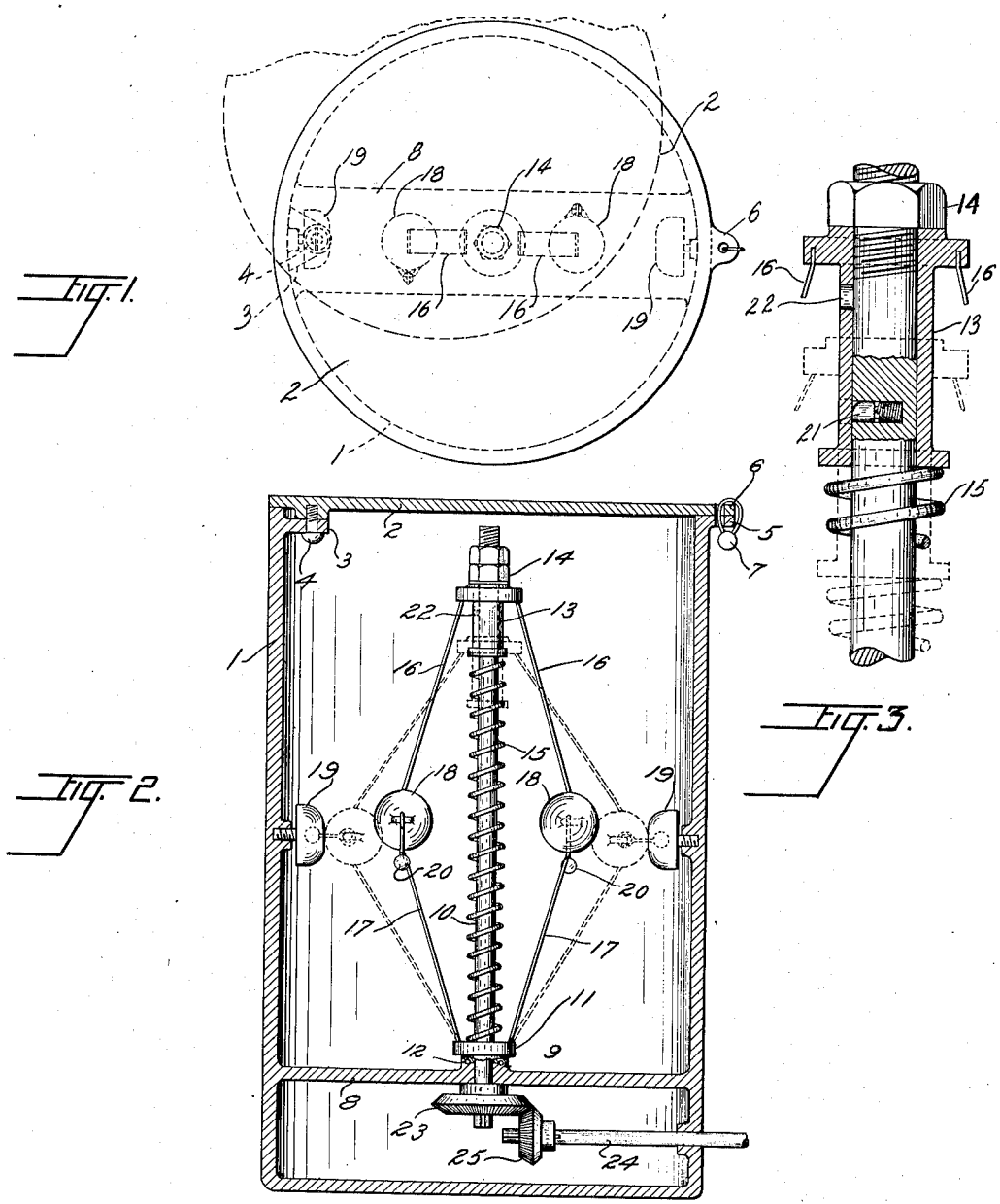

RUDOLPH BERLINER, DANIEL D. SWEM, AND HENRY F. MOORE, OF CHICAGO, ILLINOIS.

MOTOR-VEHICLE SPEED-ALARM.

1,025,607. Specification of Letters Patent. Patented May 7, 1912.

Application filed September 9, 1911. Serial No. 648,427.

*To all whom it may concern:*

Be it known that we, RUDOLPH BERLINER, DANIEL D. SWEM, and HENRY F. MOORE, citizens of the United States, and residing at Chicago, in the county of Cook and State of Illinois, have invented a new and useful Improvement in Motor-Vehicle Speed-Alarms, of which the following is a complete specification.

The main objects of this invention are to provide a speed alarm for motor vehicles adapted to produce a signal when the vehicle speed approaches a predetermined maximum; to provide a speed alarm adapted when the vehicle reaches a predetermined maximum speed to produce a continuous signal thereafter until released regardless of the subsequent speed of the vehicle; to provide a speed alarm adapted when the vehicle reaches a predetermined maximum speed to automatically lock the signaling mechanism in operative position; to provide a speed alarm in which the signaling mechanism, when locked in operative position, can only be released by a properly authorized person; and to provide a cheap, simple and durable device adapted to immediately warn the vehicle operator that he is approaching near to the speed limit.

A specific embodiment of the invention is illustrated in the accompanying drawing, in which:

Figure 1 is a top plan view of a motor vehicle speed alarm embodied in this invention. Fig. 2 is a vertical section of the casing with the signaling mechanism shown in elevation. Fig. 3 is an enlarged fragmentary view, partly in section, of the governor.

In the construction shown, the casing 1 for the alarm or signaling mechanism may be constructed of any preferred material and in any desired form. Said casing is provided with a cover or door 2 which may be secured to the casing in any desired manner, but, as herein shown, the casing is provided on its inner side, near the top thereof, with a lug 3 and a pivotal pin 4 extends therethrough and into the cover and permits the cover to be swung laterally on the casing, as shown in dotted lines in Fig. 1. On the outer side of the casing opposite from the pivotal point of the cover is an apertured lug 5, and the cover is provided with an apertured lug 6 adapted when the cover is in closed position to register with the lug 5 and permit a lock or seal 7 to be secured through said lugs and hold the cover in closed position.

Near the bottom of the casing 1 is a transverse bar 8 having on its upper side a bearing member 9 with a ball-race therein, and the governor shaft 10 extends upwardly through said bar and bearing to near the top of the casing. Rigidly secured on the shaft 10, adjacent to the bearing member 9, is the bearing member 11 having a ball-race in its under surface which registers with the race in the member 9, and bearing balls 12 are carried in said races.

Slidably mounted on the upper portion of the shaft 10 is a sleeve 13 having a flange on each end thereof. The upward movement of said sleeve on the shaft 10 is limited by a nut 14, and a spring 15 is carried on said shaft and bears at one end against the bearing member 11 and at the other end against the lower end of said sleeve and normally acts to hold the sleeve at the upper limit of its movement. The upward movement of said sleeve on the shaft and the tension of the spring against the sleeve are adjusted or regulated by the position of the nut 14. Arms or links 16 are pivotally connected at their upper ends to the sleeve 13, and arms or links 17 are pivotally connected at their lower ends to the bearing member 11. Governor balls 18 are connected to adjacent ends of said arms and act when the shaft 10 is rotated to move away from the shaft, under the action of centrifugal force and move the sleeve 13 downward against the tension of the spring 15.

Rigidly secured on the walls of the casing 1, at points opposite or laterally disposed from the balls 18, are bells or gongs 19, and pivotally hung on each ball is a hammer 20 adapted to strike the bells when a predetermined speed of the shaft is reached.

Within the shaft 10 is a spring pushed pin 21 which normally bears against the inner side of the sleeve 13, and the sleeve is provided near its upper end with an aperture 22, adapted when the sleeve is lowered by the action of the balls 18 to have the pin 21 projected thereinto and hold the hammers 20 in position to continually strike the balls. On the lower end of the shaft 10 is a beveled gear 23, and a drive shaft 24 is journaled in the casing and is provided on its inner end with a beveled pinion 25 in mesh with the gear 23. The shaft 24 is connected with or driven from the drive mechanism of the vehicle on which the alarm is used, and is so timed that the alarm will produce a signal at a predetermined speed of the vehicle.

The operation of the construction shown is as follows: When the governor shaft is rotated the governor balls are thrown outwardly as the speed increases. The relation of the bells and hammers is so adjusted that as the vehicle speed nears a predetermined maximum the hammers will strike the bells and produce an audible signal. Should the speed of the vehicle then be decreased the hammers will be retracted and the signal cease. If however the speed of the vehicle is increased to the predetermined maximum the pin 21 will enter the aperture 22 in the sleeve 13 and hold the hammers in operative position so that they will strike the bells at any speed of the vehicle, until the casing is opened and the pin released from the sleeve.

While but one specific embodiment of the invention has been herein shown and described it will be understood that many details of the construction shown may be varied or omitted without departing from the scope of the claims.

We claim:

1. A motor vehicle speed alarm, comprising a bell, means operatively connected with the vehicle adapted to strike the bell at a predetermined speed of the vehicle, and mechanism adapted to lock said means in operative position when the speed of the vehicle is further increased.

2. A motor vehicle speed alarm, comprising mechanism adapted to automatically produce a signal at a predetermined speed of the vehicle, and means associated with said mechanism adapted when the speed of the vehicle is further increased to lock said mechanism in position to continue the signal regardless of the subsequent speed of the vehicle.

3. A motor vehicle speed alarm, comprising mechanism operated by the vehicle adapted to produce a signal at a predetermined speed of the vehicle, means adapted to lock said mechanism in position to continue the signal when the speed of the vehicle is further increased, and a casing containing the structure thus formed and adapted to prevent said locking means being released except by an authorized person.

4. A motor vehicle speed alarm, comprising, a gong, a centrifugal governor, means on the governor adapted to strike the gong at a predetermined speed of the vehicle, and means adapted to lock the striking means in operative position when the vehicle speed is increased.

5. A motor vehicle speed alarm, comprising a centrifugal governor adapted to be operatively connected with the vehicle, a gong positioned near the governor, means on the governor adapted to strike the gong when the vehicle reaches a predetermined speed, and locking means on the governor adapted to lock it in position for the striking means to continue to strike the gong as soon as the vehicle speed is further increased and maintain such position regardless of subsequent speed of the vehicle.

6. A motor vehicle speed alarm, comprising a governor shaft, means for rotating said shaft, a slidable sleeve on the shaft, a spring normally holding the sleeve at its outward limit of movement, governor balls connected with the sleeve and adapted to move it against the tension of the spring, a gong, means connected with the balls adapted to strike the gong, and a locking pin on the shaft adapted to lock the sleeve in retracted position and hold the striking means in position to strike the gong.

In witness whereof we have hereunto subscribed our names in the presence of two witnesses.

RUDOLPH BERLINER.
DANIEL D. SWEM.
HENRY F. MOORE.

Witnesses:
Cherrie M. Sly,
W. W. Withenbury.